No. 811,374. PATENTED JAN. 30, 1906.
C. CHRISTIANSEN.
FRICTION CLUTCH AND GOVERNOR.
APPLICATION FILED JULY 30, 1904.
2 SHEETS—SHEET 1.
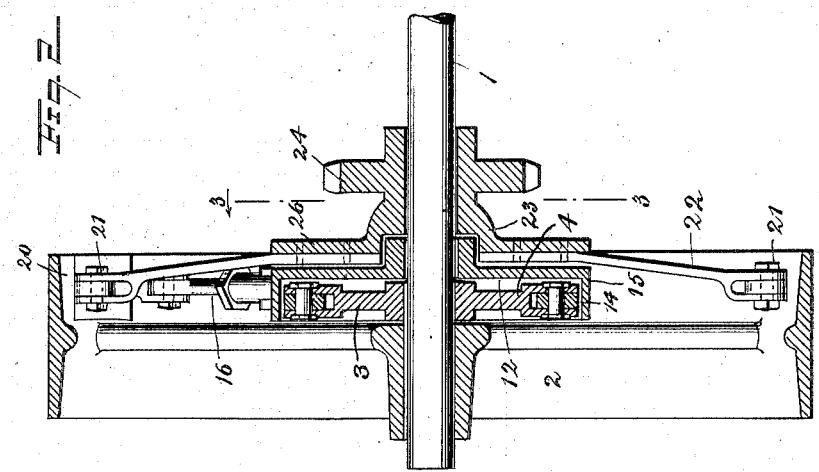
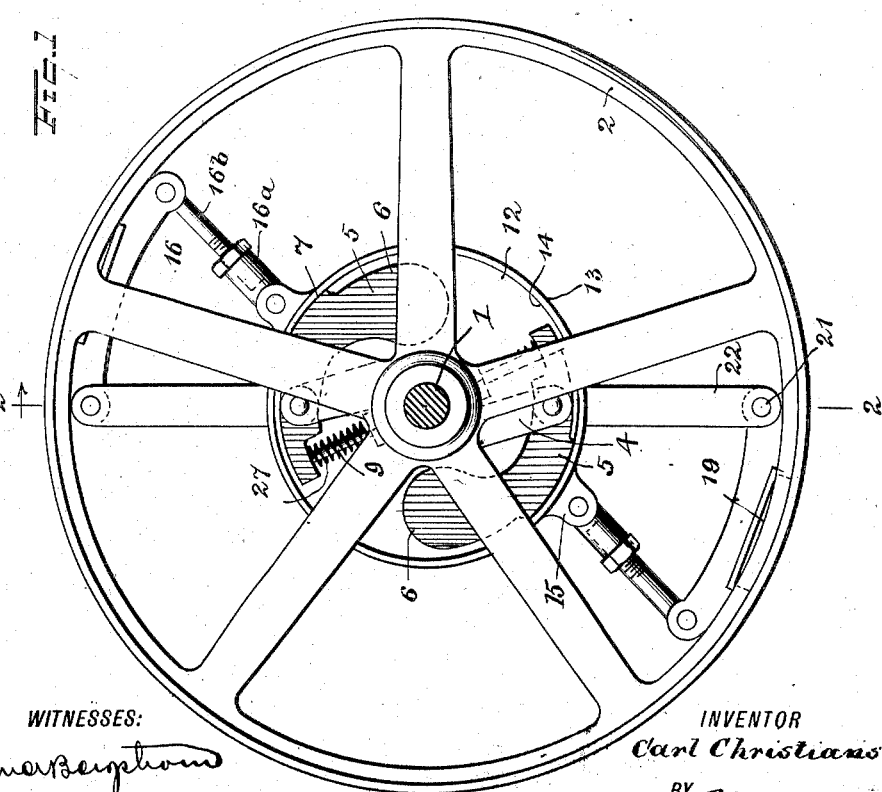
WITNESSES:
INVENTOR
Carl Christiansen
BY
ATTORNEYS No. 811,374. PATENTED JAN. 30, 1906.
C. CHRISTIANSEN.
FRICTION CLUTCH AND GOVERNOR.
APPLICATION FILED JULY 30, 1904.
2 SHEETS—SHEET 2.
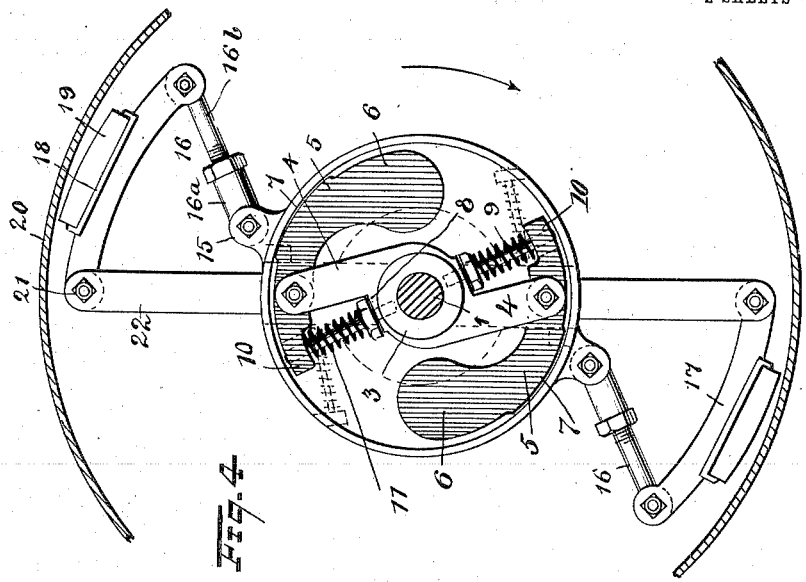
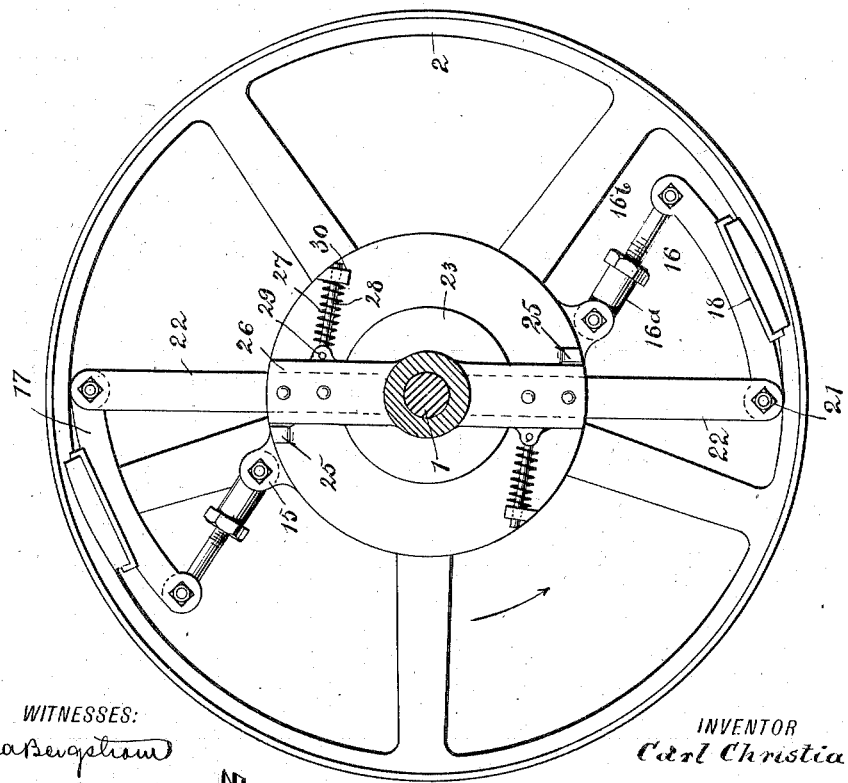
WITNESSES:
INVENTOR
Carl Christiansen
BY Munn & Co
ATTORNEYS

UNITED STATES PATENT OFFICE.

CARL CHRISTIANSEN, OF CROOKSTON, MINNESOTA.

FRICTION-CLUTCH AND GOVERNOR.

No. 811,374. Specification of Letters Patent. Patented Jan. 30, 1906.

Application filed July 30, 1904. Serial No. 218,789.

*To all whom it may concern:*

Be it known that I, CARL CHRISTIANSEN, a citizen of the United States, and a resident of Crookston, in the county of Polk and State of Minnesota, have invented a new and Improved Friction-Clutch and Governor, of which the following is a full, clear, and exact description.

My invention relates to friction-clutches and governors, and is intended especially for use in connection with band-cutters and feeders for threshing-machines.

The object of the invention is to produce a powerful and sensitive friction-clutch which will operate as a governor, serving to connect and actuate the feeder and band-cutter as soon as the threshing-machine has obtained sufficient speed to operate efficiently.

The invention consists of novel features and parts and combinations of the same, which will be described hereinafter and then pointed out in the claims.

Reference is to be had to the accompanying drawings, forming a part of this specification, in which similar characters of reference indicate corresponding parts in all the figures.

Figure 1 is a side elevation of the device. Fig. 2 is a section taken substantially on the line 2 2 of Fig. 1. Fig. 3 is a section taken substantially on the line 3 3 of Fig. 2; and Fig. 4 is a view representing the side of the device opposite to that shown in Fig. 1, a portion of the same being broken away and shown in section.

Referring more particularly to the parts, 1 represents an axle or shaft upon which there is rigidly mounted a pulley 2. Adjacent to this pulley upon the shaft 1 there is rigidly attached a hub 3, the same having oppositely-projecting arms 4, near the extremities whereof governor-weights 5 are pivotally attached, as shown. These weights have enlarged bodies 6 and circumferentially-disposed rubbing-faces 7 for a purpose which will appear more fully hereinafter. As shown, the arms 4 preferably extend substantially tangentially to the hub. The hub is preferably provided with oppositely-disposed faces or shoulders 8, in which are mounted stems 9, the outer extremities whereof are received in the bifurcated extremities 10 of the aforesaid governor-weights 5, as indicated. Around the stems 9 coiled springs 11 are placed, and these springs thrust against the extremities of the governor-weights in such a manner as to constrain the bodies thereof inwardly, as will be readily apparent.

Loosely mounted upon the shaft 1 and adjacent to the hub 3 there is provided a friction-wheel 12, which has a marginal flange 13 presenting upon its inner side a rubbing-face 14, which face lies adjacent to the aforesaid faces 7 of the governor-weights 5. Upon the outer side of the flange 13 oppositely-disposed ears 15 are provided, and to these ears links 16 attach, the outer extremities thereof attaching pivotally to shoe-bars 17. These shoe-bars are preferably curved substantially as shown, so as to conform generally to the outline of the pulley 2, and on their outer edges they are provided with sockets 18, in which are mounted shoes 19, the outer faces whereof are curved and normally lie adjacent to the inner face 20 of the pulley 2, it being understood that the face 20 constitutes a rubbing-face with which the shoes 19 coöperate. The extremities of the shoe arms or bars 17 are pivotally attached at 21 to radially-projecting arms 22, which attach to a second hub 23, loosely mounted upon the shaft 1 adjacent to the friction-wheel 12, as indicated most clearly in Fig. 2. This hub 23 has integral therewith a sprocket-wheel 24 or similar means for transmitting the rotary movement of the hub. It should be understood that this wheel 24 would be connected in some manner with the band-cutter or feeder.

Upon the face of the friction-wheel 12 a pair of oppositely-disposed stops 25 are formed, and these stops are adapted to abut against the extremities of elongated sockets 26, whch constitute parts of the aforesaid hub 23 and which receive the arms 22, as shown. The sockets 26 are normally maintained against the stops 25 by means of coiled springs 27, which lie around stems 28 which are pivoted at 29 to the sides of the sockets, the extremities of the said stems passing loosely through ears 30, formed upon the face of the friction-pulley, as indicated most clearly in Fig. 3.

In order to effect a desirable adjustment of the shoes 19 with respect to the rim of the pulley 2, the links 16 are preferably made in parts 16ª and 16ᵇ, the former of which constitute threaded sockets receiving the extremities of the latter, as indicated.

In the operation of the device it should be understood that the pulley 2 will be rotated by a belt or similar means moving with the threshing-cylinder. When the threshing machinery shall have acquired a sufficient velocity of rotation, the centrifugal force will operate upon the bodies 6 of the weights 5 in such a manner as to throw the same outwardly in a well-understood manner, projecting their rubbing-faces 7 against the inner face of the friction-wheel 12, the rotation being in the direction of the arrows shown in Figs. 3 and 4. In this way a firm frictional engagement is made between the weights 5 and the wheel 12, and this should become sufficient to advance the wheel 12 with the rotating hub 3 and the shaft 1. At this point it should be observed that the links 16 pass toward the wheel 12 in an inclined direction and in such a way that when the pulley is rotated in the direction indicated the pivotal points of attachment of the links 16 with the ears 15 move outwardly with respect to the pivots 21. In this manner they project the free extremities of the shoe-bars 17 outwardly toward the rim or rubbing-face 20 of the pulley 2. If moved sufficiently, the shoes 19 will come in contact with the rim of the pulley 2 and bring about a firm frictional engagement therewith From this arrangement and mode of operation it should be understood that the device constitutes a clutch, and when the parts are in frictional engagement, as described, the arms 22 will rotate with the shoe-bars and operate, of course, to rotate with them the hub 23, to which they are attached, and this hub, it will be observed, is integral with the wheel 24, which actuates the band-cutter or feeder mechanism.

It should be observed that the connection between the wheel 12 and the shoes 17 is substantially a toggle joint or connection, so that a slight frictional force exerted at the rubbing-faces 7 will support a very considerable force in the links 16. The force exerted in the links 16 applies itself very advantageously to the broad inner rubbing-surface 20 of the pulley 2. For this reason evidently the friction-clutch and governor should be very efficient, sensitive, and powerful. The springs 27, like the springs 9, operate normally to maintain the shoes 19 out of contact with the rubbing-faces with which they coöperate.

While the device is intended especially for use in the connection suggested, evidently the clutch should have a wide usefulness in all situations where clutches of this general character are now employed.

In a certain aspect the inner portion of the clutch described may be considered as itself constituting a clutch and likewise with respect to the outer portion of the clutch. Taking this view, the entire device consists of an inner clutch, which when applied operates to apply a second or outer clutch, both the clutches being under the control of the governing means for the inner clutch.

Having thus described my invention, I claim as new and desire to secure by Letters Patent—

1. In a device of the class described, in combination, a shaft, a member rigid therewith governor-weights carried by said member, a friction-clutch controlled by said governor-weights, a pulley, shoes coöperating therewith, and a connection between said shoes and said clutch.

2. In a device of the class described, in combination, a shaft, a pulley carried rigidly thereby, a friction-wheel carried loosely and a hub carried rigidly by said shaft, governor-weights carried by said hub, and coöperating with said friction-wheel, to constitute a clutch, shoes mounted adjacent to said pulley, and links connecting the shoes with said wheel.

3. In a device of the class described, in combination, a shaft, a loose wheel carried thereby, a tight pulley carried thereby, governor-weights rotating with said shaft and having rubbing-faces which may engage said loose wheel, shoes coöperating with said tight pulley, links connecting said shoes with said loose wheel, and affording means for transmitting the rotation of said shoes.

4. In a device of the class described, in combination, a shaft, a tight pulley carried thereby, a loose wheel carried thereby, a speed-controlled clutch member coöperating with said loose wheel, shoe-bars, shoes carried thereby rubbing the face of said tight pulley, links connecting the said shoe-bars with said loose wheel, and a hub loose upon said shaft and having projecting arms to which said shoe-bars attach.

5. In a device of the class described, in combination, a shaft, a tight pulley carried thereby, a loose wheel carried thereby, a loose hub carried by said shaft, adjacent to said loose wheel, stops for limiting the rotation of said hub with respect to said loose wheel, springs normally restraining said hub into an extreme position with respect to said loose wheel, shoe-bars attached to said hub and having shoes rubbing against said tight pulley, means for connecting said shoe-bars with said loose wheel, and speed-controlled mechanism for rotating said loose wheel.

6. In a device of the class described, in combination, a shaft, a tight pulley carried thereby, a loose wheel carried thereby, a loose hub carried by said shaft adjacent to said loose wheel, said loose wheel having projections constituting stops therefor, springs normally restraining said hub to engage said stops, said hub comprising oppositely-disposed sockets, arms attached in said sockets, shoe-bars attached to said arms and having shoes adapted to rub the face of said tight pulley, links connecting said shoe-bars with said loose wheel, and speed-controlled mechanism for rotating said loose wheel.

7. In a device of the class described, in combination, a shaft, a tight pulley carried thereby, a loose wheel carried thereby, a hub carried rigidly by said shaft, governor-arms pivotally carried by said hub and having rubbing-faces adapted to engage said loose wheel, a loose hub carried by said shaft, projecting arms attached thereto, shoe-bars attached to said arms and having shoes adapted to rub the face of said tight pulley, links connecting said shoe-bars with said loose wheel, and springs connecting said loose hub with said loose wheel.

In testimony whereof I have signed my name to this specification in the presence of two subscribing witnesses.

CARL CHRISTIANSEN.

Witnesses:
J. W. WHEELER,
O. M. PIERCE.